United States Patent [19]
Cumpston, Jr.

[11] 3,934,737
[45] Jan. 27, 1976

[54] METHOD AND APPARATUS FOR SILO STORAGE AND UNLOADING

[76] Inventor: Edward H. Cumpston, Jr., 43 Monument Ave., Old Bennington, Vt. 05201

[22] Filed: Jan. 15, 1975

[21] Appl. No.: 541,282

[52] U.S. Cl............... 214/16 R; 214/152; 222/502
[51] Int. Cl.² ........................................ B65G 65/64
[58] Field of Search ............ 214/16 R, 17 R, 17 D; 222/199, 409, 502, 544, 545

[56] References Cited
UNITED STATES PATENTS
| | | | |
|---|---|---|---|
| 1,443,181 | 1/1923 | Hill | 222/502 |
| 2,902,189 | 9/1959 | Bührer | 222/199 |

Primary Examiner—Robert G. Sheridan
Attorney, Agent, or Firm—Stonebraker, Shepard & Stephens

[57] ABSTRACT

Paper, cardboard, thin wood chips, and other feltable, non-flowable and generally laminar materials are stored in a silo and supported by generally parallel beams at a level above a base platform. The material mats together and is self-supporting in a general arch shape between the beams and is removed from the silo by lowering the beams one at a time to lower a portion of the material while the rest of the material is self-supporting in a general arch shape upheld by beams other than the lowered beam. Lowered material is moved off the base platform and out from under the self-supporting material above, the lowered beam is raised to its original level, then another beam is lowered to repeat the process indefinitely.

10 Claims, 5 Drawing Figures

METHOD AND APPARATUS FOR SILO STORAGE AND UNLOADING

THE INVENTIVE IMPROVEMENT

Present methods for handling and storing waste paper and similar materials are relatively expensive. Waste paper is usually baled, stored in warehouses, and moved about with forklift trucks. Paper-making plants using waste paper normally operate 24 hours a day and require a steady supply, and yet the practicalities of the waste paper market often require recyclers to take all the output from a single supplier at an irregular rate. When many tons a day are involved, the storing and handling of waste paper becomes very expensive.

The invention involves recognition of a way that waste paper and similar materials can be stored in silos and unloaded from the bottom of the silo. The inventive discovery followed considerable experimentation, including observation of the behavior of loose paper stored in a silo, and many unsuccessful attempts at unloading the paper from the bottom of the silo. The invention aims at simple, practical, and economical storing and handling of waste paper and similar materials at lower cost and without fire hazards or other disadvantages.

SUMMARY OF THE INVENTION

The inventive method and apparatus applies to feltable, non-flowable and generally laminar material, such as paper, cardboard, corrugated cardboard and thin wood chips stored in a silo elevated above a base platform. The silo has generally parallel beams elevated above the base platform and supporting the material which is self-supporting in a general arch shape between the beams. The material is unloaded by lowering one of the beams to the region of the base platform to lower a portion of the material above the lowered beam, with the material above the lowered portion being self-supporting in a general arch shape upheld by beams other than the lowered beam. The lowered material is moved from the base platform and out from under the arch of self-supporting material above the lowered beam, and the lowered beam is raised back up to the level of the other beam. The process is repeated with other beams in succession, and each lowering of a beam loosens and lowers another volume of material that is removed before the beam is returned to its original elevated position.

DRAWINGS

DETAILED DESCRIPTION

Figure 1:
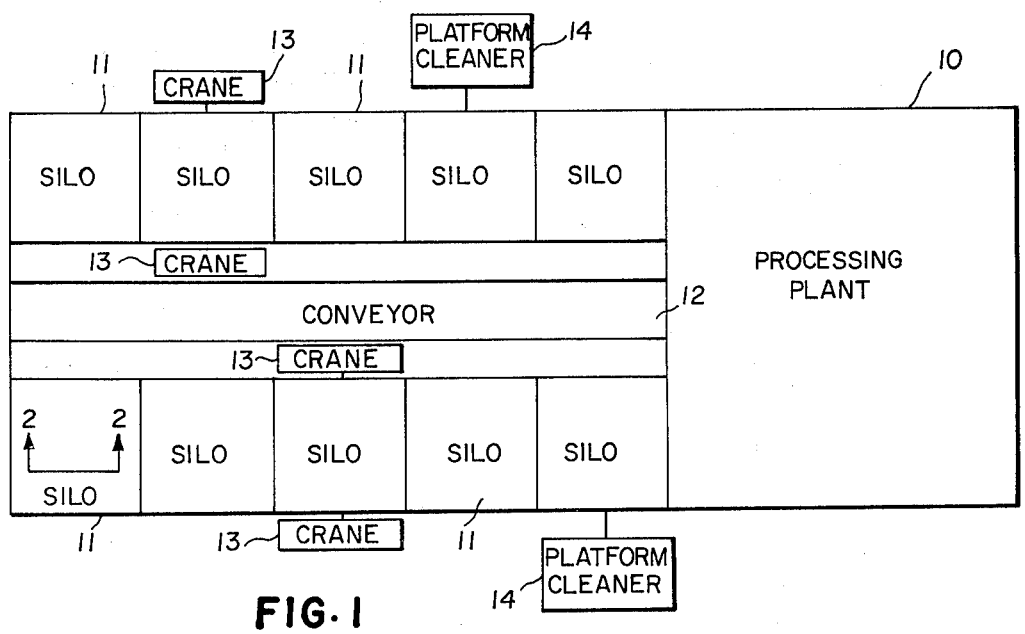
FIG. 1 is a partially schematic plan view of a processing plant and an arrangement of silos according to the invention.

The invention applies to waste paper storage and to storage of materials having similar properties that are generally described as feltable, non-flowable, and generally laminar. Such materials include loose waste paper, cardboard, corrugated cardboard, and thin wood chips. These materials are all generally laminar, and tend to lie together in overlapping planes, so that when the material is piled very deep, pressure between adjacent sheets or layers produces enough friction so that discreet pieces of material are held together with considerable friction and cannot move laterally or slide one surface along another. The pressure of storage in a silo then makes such materials effectively felted together and non-flowable so that even with access to the bottom of a storage silo, such materials cannot be pulled apart or separated from the stored mass by previous techniques.

Experiments have been performed with loose waste paper stored in a silo, and from the observed effects with paper, the invention is expected to work satisfactorily with cardboard and corrugated cardboard. In addition, previous experience of the applicant with thin wood chips intended for more rapid pulping than conventional wood chips suggests that thin, laminar wood chips approximately the thickness of thick paper or cardboard are also feltable and non-flowable in a way similar to the behavior of paper, and are also subject to silo storage according to the invention. Other materials, such as hay, straw, and sugar cane may have similar enough storage characteristics so that the invention will apply to them, too.

In experiments leading up to the inventive discovery, loose paper was stored in a silo with the intention of cutting the paper free at the bottom of the silo to accomplish unloading. Bottom unloading is important, because otherwise relatively complex equipment has to be developed to cover the whole area of the silo and work from top to bottom, and loading and unloading cannot be accomplished at the same time. Many attempts at cutting away paper from the bottom of the storage stack, including saws and high-pressure water jets all proved ineffective, because the stored sheets could not be moved relative to each other and only small quantities could be cut away at one time with considerable effort and expense.

In the process, applicant made several discoveries about paper and similar materials stored in silos. One important factor is that these materials do not pack tightly against the silo walls and hence do not build up pressure against the walls as flowable materials do. This means that the outer walls of the silo do not have to be circular, and do not have to be made increasingly stronger toward the bottom of the silo. It is possible to thrust a hand up through an arm's length of stored paper along outer wall of the silo, whereas the paper is hard and tightly packed inward from the outer wall. Stored paper also packs to a density approximately equal to the density of paper bales, so that a silo can store as much loose paper as an equal volume of warehouse space for baled paper. Also, loose paper stored in a silo does not allow air to pass from bottom to top and so is relatively safe from fires. If the bottom of the storage stack is set afire, it does not burn well, and the flames cannot get access to upper layers of paper. If a fire starts in the top of a silo, it can be dealt with quickly and effectively, especially if the silo is closed at the top as preferred.

These observations showed that great economies could be effected if silos 60 m or so tall could be loaded with loose paper by blowing the paper up into the top of the silo and could be unloaded somehow from the bottom. The silos would not have to be made especially strong because of the low pressure of paper against the outer walls, they could be made rectangular, and in rising to a considerable height, they could provide much cheaper storage than warehousing of baled paper. Also, the silos could be erected adjacent a processing plant to supply a steady flow of material while loading proceeded at variable rates.

The solution to the problem is described below relative to loose waste paper, with the understanding that the solution applies equally at least to cardboard, corrugated cardboard, and thin wood chips, and possibly also to other materials.

The inventive solution is to arrange vertically movable, generally parallel beams across the bottom of the silo, with the beams normally elevated above a base platform and with the beams supporting the paper which mats or felts together to be self-supporting in general arches between the beams. Then the beams are lowered one at a time in succession to lower a portion of the paper to the base platform with the remainder of the paper being matted and self-supporting in a general arch above the lowered beam and supported by adjacent beams. The lowered paper is then moved off the base platform and out from under the self-supporting arch of paper overhead, the lowered beam is raised to its original level, and the process repeated by lowering another beam.

The inventive unloading process will be described in greater detail as the preferred silo and unloading equipment is described.

A processing plant 10 is schematically shown in FIG. 1 as having a plurality of silos 11 arranged in two parallel rows adjacent plant 10. Each silo 11 can cover a considerable area such as 300 sq. m or more and rise to a height of 70 m or more for storage capacity of over 20,000 cubic meters. Each of silos 11 is preferably rectangular and covered at the top, and the walls of silo 11 protect the stored paper from the weather, and keep outside air away from the paper to prevent fires.

Generally known equipment (not shown) is used for loading silos 11, and this is preferably done by blowing loose paper into the tops of silos 11 while drawing air from the tops of silos 11. Silos 11 are all preferably relatively airtight, and if a fire occurs in the top of a silo, carbon dioxide can be blown into the silo with the paper-loading equipment to extinguish the flames.

A conveyor 12 runs between the two rows of silos 11 and leads to processing plant 10 so that paper unloaded from a silo 11 can be pushed onto conveyor 12 and delivered to plant 10.

Each row of silos 11 has a pair of cranes 13 on opposite sides, so that cranes 13 can move along the length of each silo row for lowering and raising beams to unload stored paper. Also, platform cleaners 14, preferably operating from outside of each silo row toward conveyor 12, clear the platforms under the silos of paper deposited on the platforms by lowering one of the cross beams under the silos. Platform cleaners 14 can be self-propelled loaders or bulldozers that push a mass of lowered paper out from under a silo, or hydraulic or other pusher devices can be built in place alongside each silo 11 for pushing out lowered paper. Moreover, the base platform under each silo 11 can be formed as a conveyor transverse to conveyor 12 so that paper lowered to the base platform under a silo 11 can be moved to conveyor 12 by the moving platform under the silo.

Figure 2:
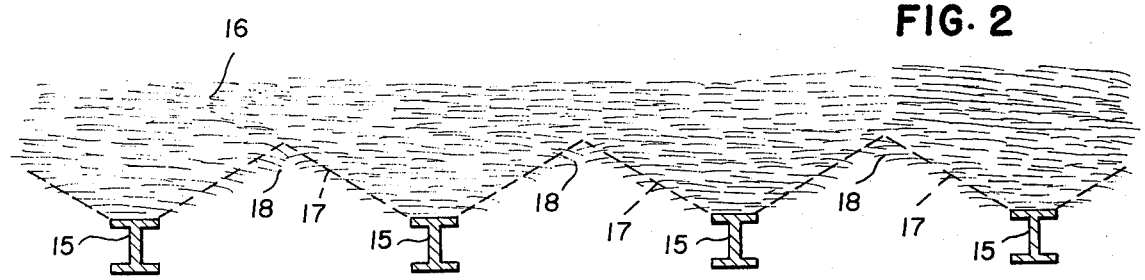
FIG. 2 is an enlarged, cross-sectional view of one of the silos of FIG. 1 taken along the line 2—2 thereof.
Figure 3:
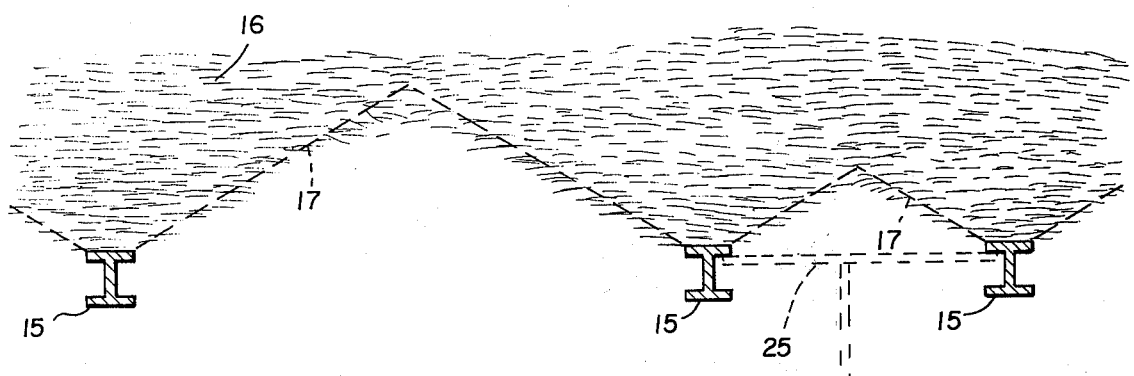
FIG. 3 is an enlarged, cross-sectional view similar to the view of FIG. 2 and showing the lowering of material by a support beam.
Figure 3:
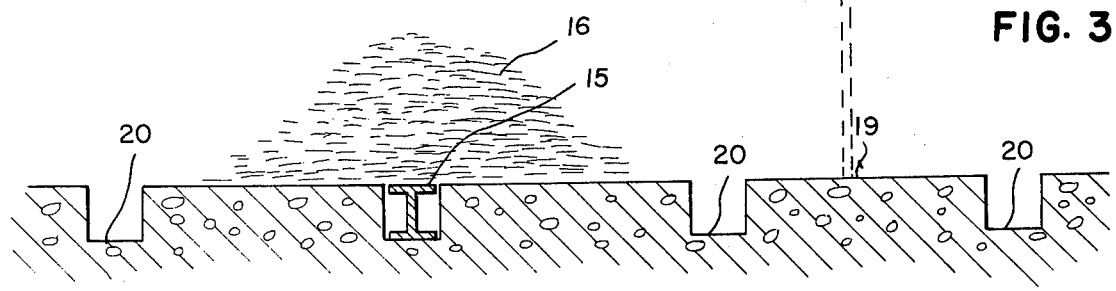

FIGS. 2 and 3 show cross beams 15 that extend across the full width of each silo 11 and support the paper or other stored material 16 extending from beam 15 upward as far as desired in silos 11. The paper 16 above any beam 15 mats in layers that prevent any lateral movement so that a wider and wider load of paper can be supported above any one of the beams 15 with increasing height above beam 15. Paper 16 is then self-supporting across fairly wide gaps between beams 15, and broken lines 17 schematically show the general line of firmly packed, self-supporting paper sheets 16 between beams 15. Loose edges 18 of paper sheets having an edge trapped in the hard-packed mass of paper 16 above broken line 17 dangle downwardly from the region of broken line 17, but the frictional matting together of paper 16 supports many meters of paper above beams 15 without collapsing or falling into the space between beams 15. Experience with the invention suggests that beams 15 can be placed between 2 and 3 meters apart and still support the stored mass generally, even when one of the beams is lowered.

The effect of lowering a beam 15 is best shown in FIG. 3. Elevated beams 15 support paper mass 16 above broken line 17, while a lowered beam 15 lowers a portion of paper 16 to base platform 19, which preferably has recesses 20 receiving lowered beam 15 approximately flush with the upper surface of base platform 19 as illustrated. Then a loader or pushing device 14 pushes the lowered paper 16 off of platform 19 and out from under the self-supporting arch of paper 16 above broken line 17. Lowered beam 15 is then raised to the original level above base platform 19, and the process is repeated by lowering another beam 15. The stored mass of paper 16 generally settles down on beams 15 so that the entire mass lowers as the unloading process proceeds. Lack of pressure against the silo walls prevents the walls from upholding the stored mass.

Figure 4:
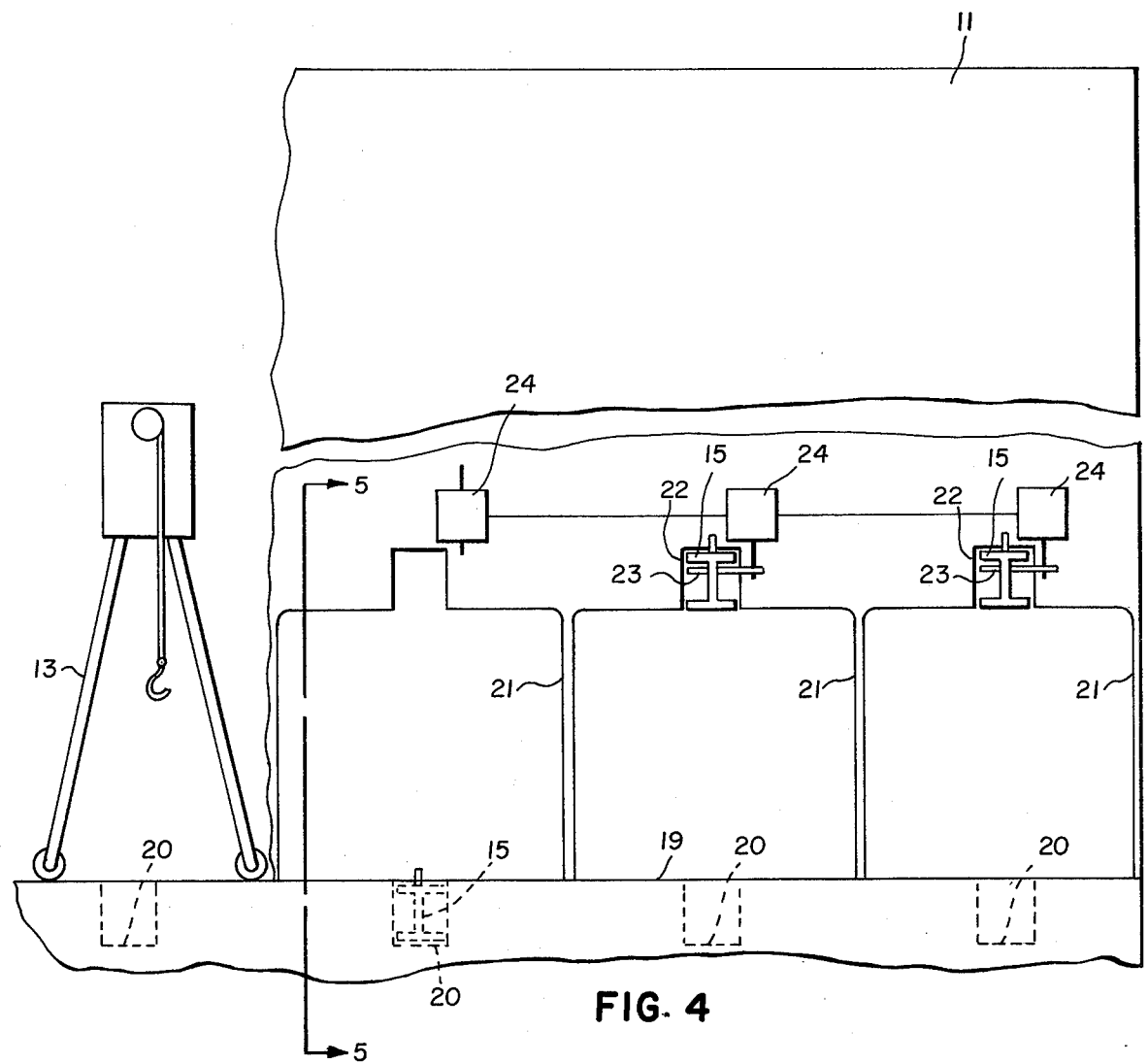
FIG. 4 is a partially schematic, partially cut-away elevational view of one of the silos of FIG. 1.

Silo 11 preferably has access openings 21 on opposite sides in the region of the opposite ends of beams 15 as best shown in FIG. 4, so that equipment for moving lowered paper can move in through an access opening 21 and push paper 16 out through the opposite access opening 21.

Beams 15 are preferably pinned or locked in their elevated positions, and as schematically shown in FIG. 4, beams 15 are locked in channels 22 by pins 23 that are held in place by interlock devices 24 so that only one of the pins 23 can be removed at a time. Many different mechanical or electromechanical interlocking devices 24 are possible within the spirit of the invention and some such device is preferred so that only one beam can be lowered at a time. If several or all the beams were lowered, then the entire silo load would be dropped on base platform 19 and would be very difficult and expensive to remove. So to prevent any working errors, it is important that only one beam 15 be lowered at a time, or at least only widely separated beams 15 be allowed to be lowered at once, so that the main silo load remains supported above platform 19 by the elevated beams locked in place while another beam is lowered.

Figure 5:
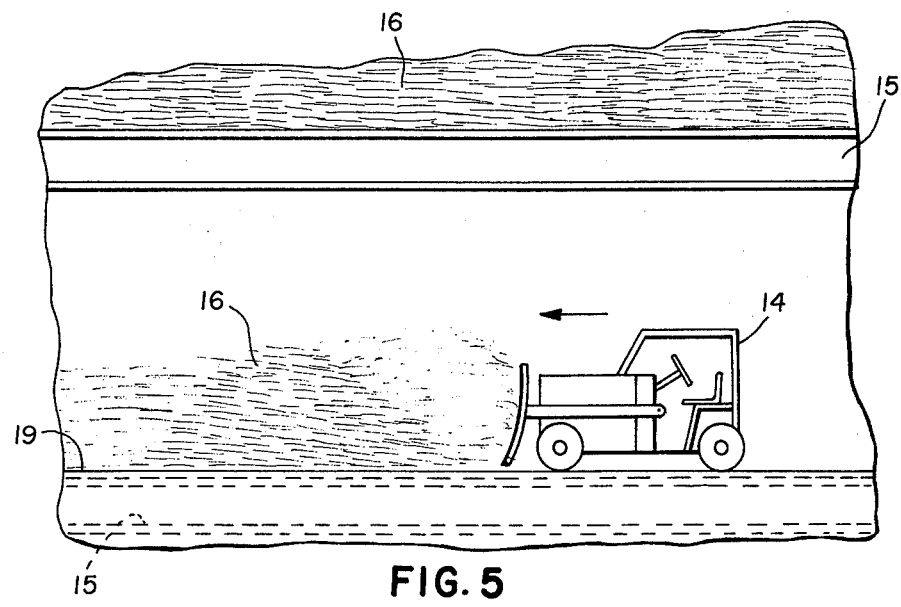
FIG. 5 is an enlarged, fragmentary, cross-sectional view of the silo of FIG. 4 taken along the line 5—5 thereof.

A self-propelled pusher vehicle 14 is shown schematically in FIG. 5 as moving lowered paper 16 off of support platform 19 above a lowered beam 15, while elevated beams 15 support the rest of the silo load 16 above base platform 19. Many pushing or paper moving devices are possible besides a self-propelled vehicle.

To facilitate the initial loading of the silo a plane support plate 25, which can be formed of sheets of plywood or other supporting material, is placed between beams 15 and upheld by removable posts 26 as shown in broken lines in FIG. 3. After a self-supporting depth of paper is piled above beams 15 and supports 25, posts 26 are removed, supports 25 and a small quantity of paper 16 above them are dropped to platform 19, the paper coming down with supports 25 is pushed off of platform 19, and the remainder of paper 16 is left self-supporting above beam 15 as illustrated. An alternative is to fill the silo from platform 19 up over beams 15 and then push out all the paper below beams 15 to produce the same general result.

Those skilled in the art will appreciate the advantages of using the inventive silo storage and unloading methods and apparatus for paper, cardboard, and corrugated cardboard, and the invention may also be applied to other feltable and non-flowable or generally laminar materials. Thin wood chips sliced to cardboard thickness or less have many known advantages in being rapidly pulped for paper making, but they felt together and mat like paper, so they are not flowable, and there has been no previous way of storing and handling thin wood chips to take advantage of their efficiency. However, the inventive silo storing and unloading should work on thin wood chips as well as on paper and should make possible the widespread use of thin wood chips for more efficient paper making than has been possible with the relatively thick but flowable chips previously used. Those skilled in the art will appreciate the many ways the invention can be put to use and the many advantages of the invention once they understand the operating principles involved. They will also know of many ways that variation in silo structure and equipment and devices for raising and lowering beams can be made effectively.

I claim:

1. A method of unloading feltable, non-flowable, generally laminar materials such as paper, cardboard, corrugated cardboard, and thin wood chips from a storage silo elevated above a base platform and having a plurality of vertically movable cross beams normally held at a level above said base platform in the bottom region of said silo for supporting said material in said silo, said method comprising:
    a. lowering one of said beams to the region of said base platform to lower a portion of said material above said lowered beam, said material above said lowered portion of said material being self-supporting in a general arch shape upheld by ones of said beams other than said lowered beam;
    b. moving said lowered portion of said material from said base platform and out from under said arch of said material above said lowered beam; and
    c. raising said lowered beam back to said level of said plurality of beams.

2. The method of claim 1 including repeating steps (a)-(c) for successively different ones of said beams.

3. The method of claim 1 including using generally plane supports between said beams to support said material during the beginning of the filling of said silo, removing said plane supports after a substantial depth of said material is deposited in said silo, and moving from said base platform any of said material falling to said base platform upon removal of said plane supports.

4. A silo for feltable, non-flowable, generally laminar materials such as paper, cardboard, corrugated cardboard, and thin wood chips, said silo comprising:
    a. a base platform;
    b. walls extending above said base platform and substantially enclosing a storage chamber;
    c. a plurality of generally parallel beams extending across the bottom region of said silo at a level above said base platform, said material being supported on said beams and being self-supporting in a general arch shape between said beams;
    d. said walls providing an access opening to said base platform from the region of the ends of said beams;
    e. means for lowering said beams one at a time in succession from said level above said base platform to the region of said base platform and for raising said beams back to said level above said base platform; and
    f. means for moving from said base platform the portion of said material lowered by lowering each of said beams while the remainder of said material is self-supported in a general arch shape upheld by ones of said beams other than a lowered one of said beams.

5. The silo of claim 4 including interlock means for allowing only one of said beams to be lowered at a time.

6. The silo of claim 4 wherein said walls provide one of said access openings at opposite sides of said silo in the region of the opposite ends of said beams.

7. The silo of claim 4 wherein said base platform includes recesses for receiving a lowered one of said beams so said lowered beam is flush with the top of said base platform as said material moving means operates.

8. The silo of claim 7 including interlock means for allowing only one of said beams to be lowered at a time.

9. The silo of claim 7 wherein said walls provide one of said access openings at opposite sides of said silo in the region of the opposite ends of said beams.

10. The silo of claim 9 including interlock means for allowing only one of said beams to be lowered at a time.

* * * * *